Jan. 6, 1959      F. C. SCHWANEKE      2,867,712
STEAM TABLE GRILL
Filed April 21, 1955      2 Sheets-Sheet 1
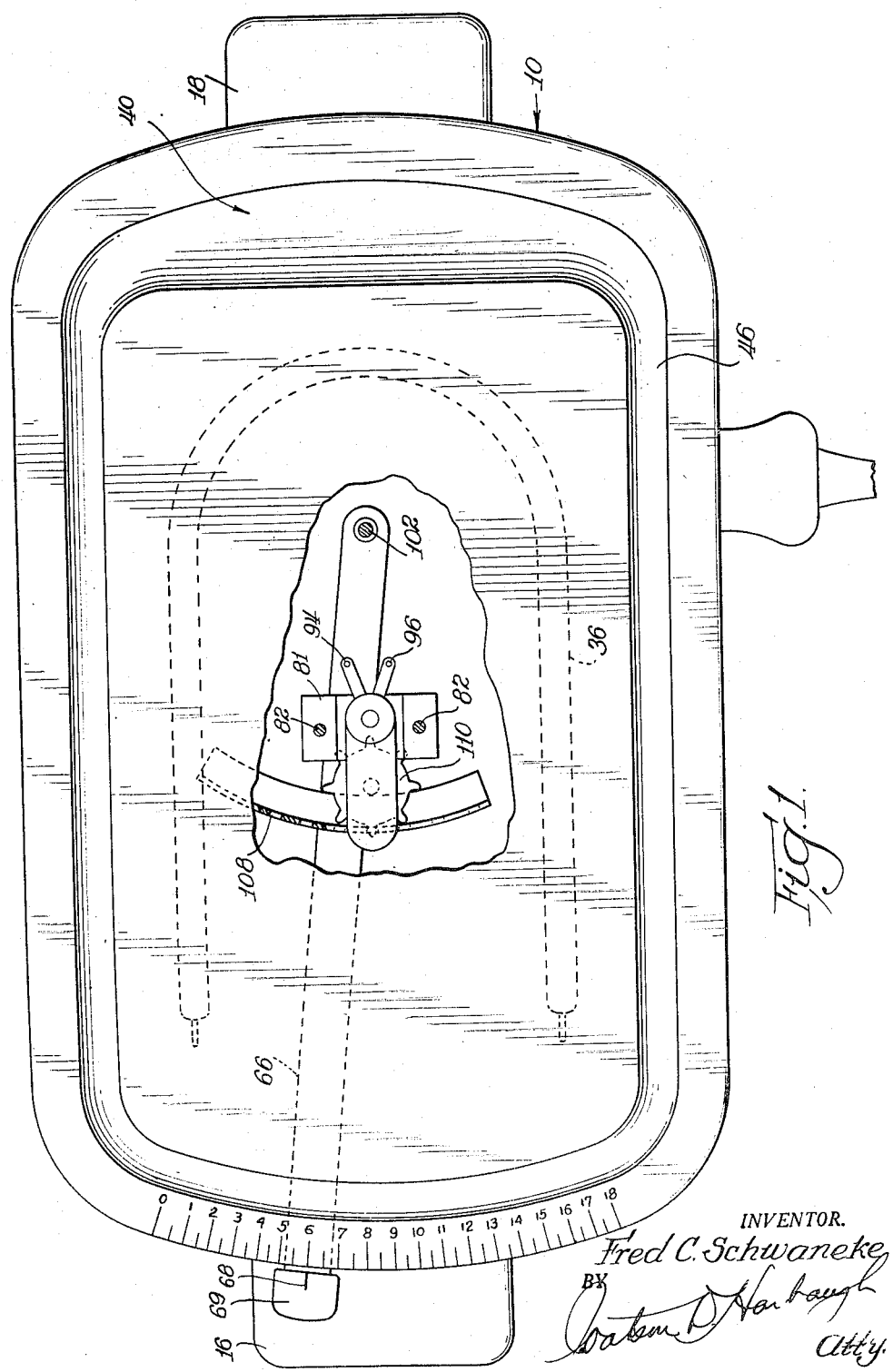
INVENTOR.
Fred C. Schwaneke

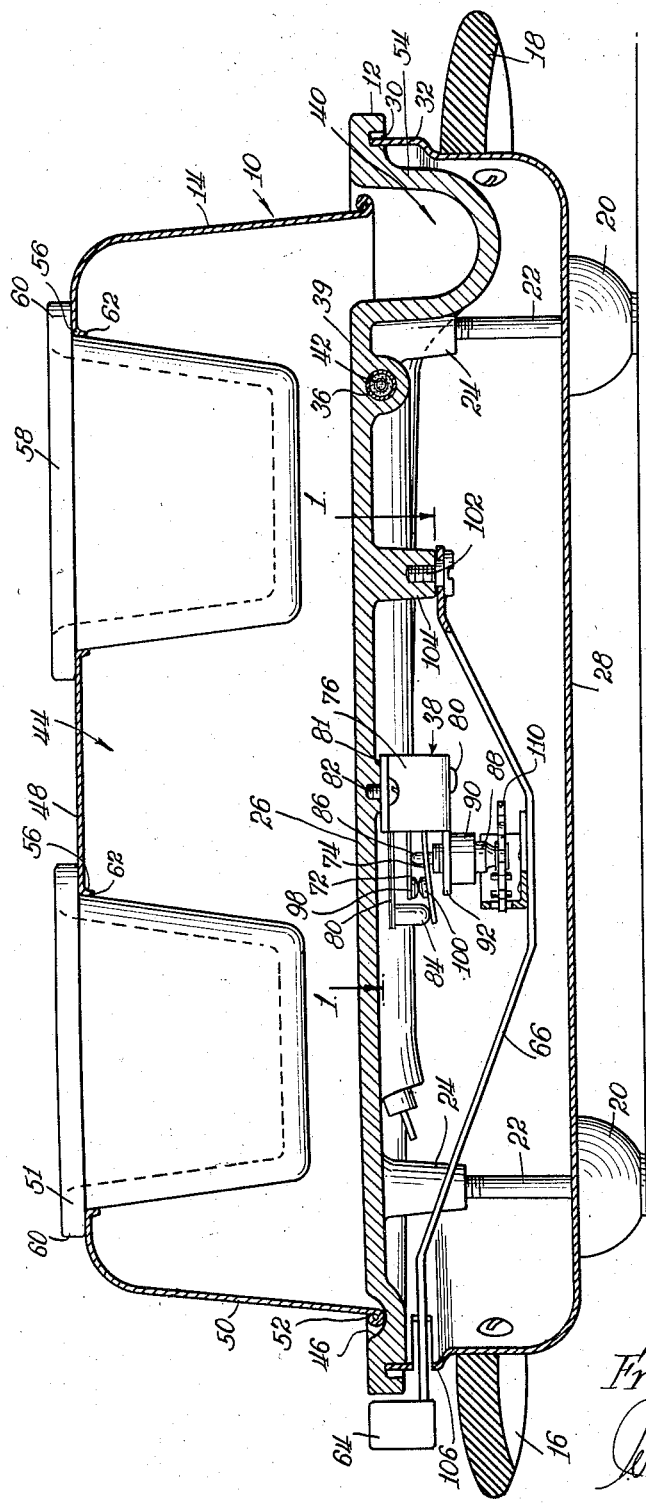

2,867,712

STEAM TABLE GRILL

Fred C. Schwancke, Chicago, Ill., assignor to Dormeyer Corporation, Chicago, Ill., a corporation of Illinois Application April 21, 1955, Serial No. 502,973

8 Claims. (Cl. 219—43)

This invention relates to a combination grill and steam table adapter, and more particularly to equipment which can be operated by means of only one heating unit to warm food in suitable containers either by steam heat or dry heat.

Heretofore separate grill and hot table units have been available, each representing a substantial investment and requiring considerable storage space. Also, steam tables currently in use have not afforded a temperature sufficiently high to maintain uncovered dishes ready for serving, and suitable means for providing dry heat for these higher temperatures or steam heat as desired have been lacking.

It will be readily apparent that the combination grill and hot table represents an advance in the cooking equipment industry of greatest importance and one which will in fact create a new branch of the industry.

It is accordingly an object of the present invention to provide a combination grill and hot table which incorporates in one utensil the functions which have heretofore required two pieces of equipment.

Another object is to provide a hot table which can be utilized selectively with steam heat or dry heat and which is operated by the same heating unit as is used for the grill thereof.

Another object is to provide a combination grill and hot table as described which when used as a steam table can efficiently revaporize condensed steam to maintain a desirable quantity of steam therein over a desirably long period of time.

Another object is to provide a grill which is configured so as to provide a vaporizing well formed integrally therewith, and whose entire surface is adapted to maintain the temperature of the hot table at desired levels.

Another object is to provide a thermostat which affords exceptionally good control over the temperature of the grid suitable for steam or dry heat, respectively, by means of a construction adapted to increase the extent of angular adjustment of a control element therefor in proportion to the angular adjustment of a manual control lever. Accordingly, the thermostat affords a very sensitive control relative to the amount of angular movement which may be made by the control lever so as to overcome the effects of possible variations in the parts of the thermostat resulting from manufacture or use. At the same time, the rack and pinion construction employed to this end avoids possible deformation of the parts of the thermostat often encountered as a result of strain developed between the lever and the thermostat proper.

Referring now to the drawings:

Fig. 1 is a top plan view of the hot-table-grill according to the invention wherein the top of the grill has been partially broken away to disclose the thermostatic control;

Fig. 2 is a vertical sectional view of the hot-table-grill of the invention; and Fig. 3 is a perspective view of the rack adapted for use with the thermostatic control of the invention.

As seen in Fig. 2 the grill and steam table adapter of the invention is referred to generally by reference numeral 10 and includes a base member and grid 12 and steam table adapter 14. The grid 12 is provided with conventional parts such as the handles 16 and 18 and elastomer feet 20 which may serve as heads for bolts 22 adapted to be threadedly received in the downwardly extending bosses 24, which are preferably integrally formed upon the relatively thick metallic grid plate 26 so that the bottom portion 28 of the grid may be secured to the grid plate 26 in secure alignment therewith. To this end also the grid is provided with a downwardly opening recess 30 extending peripherally therearound and adapted to receive therein the upper edge 32 of the bottom portion 28 of the grid.

Embedded in an elongated boss 34 extending preferably around three sides of the grid plate 26 is the elongated heating element or Calrod 36, which may be conventional in form and which is adapted to be selectively energized through a thermostatic control unit 38, to be more fully described hereinafter.

In order that the grid may serve to energize a steam table, the grid plate 26 is provided at one end thereof with a preferably integrally formed vaporizing well 40. The vaporizing well 40 is preferably disposed adjacent one end 42 of the Calrod 36 which is intermediate the two longitudinally extending legs thereof, the portion 42 being spaced a predetermined distance relatively close to the vaporizing well so that upon energizing of the Calrod the vaporizing well will cause water contained therein to vaporize and fill the interior of the chamber formed by the steam table and cover 14 and the grid plate 26.

In order that the steam table adapter 14 may be seated securely upon the grid plate 26 and the chamber 44 formed between the grid plate and the cover be substantially sealed against external atmosphere, the grid plate is provided with a peripherally extending groove 46 extending around three sides thereof and opening into the trough 40.

The steam table adapter 14 comprises the top wall 48 spaced a predetermined distance from the plate 26, and the side portion 50 which is preferably provided along the lower edge thereof with a bead 52 adapted to seat in the grooves 46 and thereby to snugly engage the outer wall 54 of the vaporizing well.

The upper wall 48 is provided with at least one and preferably two or more apertures 56 adapted to receive therein receptacles for food 58 which are preferably ceramic or other refractory material adapted to retain heat and provided with laterally extending flanges 60 so that the upper portion of the table may also be sealed from the external atmosphere and the receptacles 58 disposed within chamber 44. The upper wall 48 may also be provided with depending flanges 62 formed annularly around the apertures 56 to insure a snug sealing fit for the receptacles.

When the chamber 44 is heated by steam from the vaporizing well 40, condensation will run down from the walls 50 to be collected in groove 46 and the well 40 for revaporizing, and the grid plate 26 will likewise revaporize moisture dropping from top wall 48. Accordingly, a desirable amount of steam may be maintained in chamber 44 without requiring constant refilling of the well 40.

Where it is desired to maintain the temperature of the chamber 44 at higher levels than are attained by the use of steam, as for example, when the receptacles 58 are kept uncovered so that the food may be ready for immediate serving, the grid plate 26 can create a dry heat in chamber 44 such as, for example, a temperature of 250° F., for this purpose.

Referring now to Fig. 1, a lever 66 is provided having a handle 69 with index mark 68 for alignment with the scale there shown, the lever 66 being pivotally secured to grid 26 in predetermined spaced relation beyond the thermostat 38.

Referring more particularly to the thermostatic control unit 38, a pair of substantially parallel contact blades 72 and 74 are provided in spaced relation by means of an insulating cylinder 76 formed of a suitable dielectric and secured to the grid plate 26 by means of a heat conductive bolt 78 received therein. A bimetal thermally responsive actuating blade 80 is also secured in stacked parallel relation to the blades 72 and 74 upon the bolt 78 to receive heat directly from the grid at a preferably central portion thereof, within the area defined by the Calrod 36. The construction of the blades themselves may be conventional and to the end of maintaining them in a spaced-apart relation the insulating cylinder is formed of separate spacer washers disposed therebetween, a bracket member 81 being preferably provided to secure the cylinder on the grid 26 by bolts 82. The bimetallic blade 80 is provided at one end thereof with a dielectric pin 84 adapted to bear against an outer end of the blade 74 to provide a circuit breaker when the heat of the grid has reached a predetermined level. A second dielectric pin 86 is secured within the metallic tube 88, which is threadedly secured in the collar 90 so that upon angular rotation of the tube 88 the pin 86 may be moved axially in the said collar.

The collar 90 in turn is secured to the lower portion of the insulating cylinder 76 by bracket 92. As seen in Fig. 1, the blades 72 and 74 are each connected to individual leads of the heating unit 36 by means of terminals 94 and 96 are normally biased toward one another in electrically connected relation by means of the contact buttons 98 and 100 thereon.

It will be appreciated that when the pin 86 is moved upwardly a predetermined distance, the thermostatic setting of the grid will be varied and a lesser degree of deflection of the bimetallic element 80 will be required to break the circuit and cause the Calrod 36 to become de-energized.

The lever 66 is secured to the grid 26 at the said predetermined distance from the thermostatic unit 38 and the heat exchange bolt 78 thereof by means of a bolt 102 threadedly received in the depending boss 104 whereby the lever 66 may be pivoted through the slot 106 in the bottom portion 28 a desired amount as determined by the scale seen in Fig. 1.

The lever 66 is preferably bowed downwardly at its central portion to dispose a rack 108 in meshing registration with a pinion 110 axially secured to the tube 88, and when the lever 66 is turned in accordance with the scale of Fig. 1, the pinion 110 and tube 88 are given a corresponding and larger amount of angular rotation to impart a positive axial movement to pin 86.

Thus the usual strain between the manual lever and the axially moving pin which is encountered in thermostats of this type is eliminated, since these elements are not directly connected, and although the use of a longer lever than would otherwise be employed means a lesser extent of angular rotation for each movement thereof, the rack and pinion construction effecting a relatively large axial adjustment of the pin 86 to assure accurate calibration.

When it is desired to create a steam heat in the chamber 44, the vaporizing well 40 will be filled with a suitable quantity of water 114, and the lever 66 set at the reading adapted to produce a suitable amount of steam. The cover portion 14 will be set within the grooves 46 as described to substantially seal the chamber 44 from the external atmosphere and it will be appreciated that the reheating of condensed vapor as described will maintain the steam in an adequate volume over a considerable period of time.

The scale may be provided with a suitable index point for the setting appropriate to operation of the device as a steam table and for given temperatures of dry heat selectively, and the particular thermostat described will assure effective maintenance of these temperatures, as well as suitable temperatures for cooking on the grid plate 26 itself.

Similarly, the vaporizing well may be provided with a level mark indicating a suitable amount of water for use with the steam table.

Accordingly, the invention provides a hot-table and grill which is simple in construction and effective in operation, which requires no unusual skill and which eliminates the expenses and difficulties which are found in the individual grill and hot-table units currently on the market.

Although I have herein set forth a particular embodiment of the invention in considerable detail for purposes of illustration, it will be readily apparent that considerable change in these details may be made without departing from the spirit and principles of the invention, as set forth in the following claims.

What is claimed is:

1. Cooking apparatus comprising a grid having a cooking surface, means for heating said grid, an enclosure removably mounted on said grid in sealing relation therewith forming a chamber, a well, formed in said grid for the selective reception of water, said well being in communication with said chamber and atmosphere and in heat exchange relation with said grid, said enclosure being apertured for reception of food receptacles whereby heat may be imparted to food received in said receptacles either directly from said grid or through the medium of steam formed by vaporization of water in said well.

2. Cooking apparatus according to claim 1 wherein means are provided for returning condensed vapor to said well.

3. A grill and hot table comprising a grid having peripheral guide means around its edges, a table having food receptacles therein adapted to seat removably upon said grid to engage said guide means in positioned relationship and to enclose a heating chamber defined by said table and said grid, a vaporizing well formed integrally in said grid, an electrical heating unit for heating said grid and vaporizing unit within said guide means, and a thermostatic control unit comprising a bimetallic strip secured in good heat exchange relation with said grid at one end thereof and having a depending dielectric pin at the other end, a pair of contact strips secured in stacked relation to said bimetallic strip and insulated from each other and said strip at one end, said contact strips being connected to different lead ends of said heating unit respectively and being biased toward each other into normally contacting relation at the other end thereof, said bimetallic member being adapted to deflect in response to heat in said grid to separate said contact strips, a second dielectric pin and means for threadedly securing said pin in substantially perpendicular abutting relation with the other end of said bimetallic strip, a pinion axially secured to said second pin, an elongated lever pivotally secured to said grid in predetermined spaced relation to said second pin and extending outwardly of said grid for manual adjustment thereof, and means secured transversely on said lever adapted to impart a predetermined increment of angular rotation to said pinion when said lever is moved angularly whereby to set said bimetallic strip in a desired position relative to said contact strips to afford accurate thermostatic control of said heating unit.

4. The construction according to claim 3 wherein said grid is substantially rectangular and said heating unit is an elongated element embedded peripherally in said grid around at least three sides thereof, said bimetallic strip and said contact strips being disposed centrally of said grid and heating unit to afford uniform thermostatic control of said grid and hot table.

5. A grill and hot table comprising a grid, a table having food receptacles therein adapted to seat removably upon said grid to enclose a heating chamber defined by said table and said grid, a vaporizing well formed integrally in said grid, an electrical heating unit for heating said grid and vaporizing unit, and a thermostatic control switch comprising a bimetallic member secured in good heat exchange relation with said grid at one end thereof, a pair of contact strips having cooperating contacts controlled by said bimetallic member and connected to different lead ends of said heating unit, said bimetallic member being adapted to deflect in response to heat in said grid to move one of said strips and thereby separate said contacts, means for adjusting the position of the other strip with respect to said one strip to vary the point at which the bi-metallic member separates the contacts including an elongated lever pivotally secured to said grid and extending outwardly of said grid for manual adjustment thereof, said grid being provided with a peripheral groove opening into said vaporizing well, said table being adapted to seat in substantially sealing relation in said groove and against said vaporizing well to define with said grid a heating chamber adapted to be heated selectively by steam heat or dry heat, said groove and well being adapted to revaporize condensation collected therein.

6. A grill and hot table comprising a base member having an electrically heated grid, a removable relatively deep dish-shaped table member adapted to seat securely on said grid with the transverse wall thereof extending in predetermined spaced parallel relation to said grid, and one or more food receptacles supported by said wall and extending downwardly into the chamber defined by said grid and said table member, a vaporizing well formed integrally in said grid and a peripheral groove in said grid opening into said vaporizing well at either end thereof, said table member having a beaded configuration along the edge thereof adapted to engage in substantially sealing relationship with said groove and said vaporizing well, said groove being of relatively greater width than said bead, whereby condensation received therein and in said vaporizing well may be revaporized.

7. A grill and hot table comprising a base member having an electrically heated grid, a removable relatively deep dish-shaped table member adapted to seat securely on said grid with the transverse wall thereof extending in predetermined spaced parallel relation to said grid, and one or more food receptacles supported by said wall and extending downwardly into the chamber defined by said grid and said table member, said receptacles being provided with a peripheral flange extending laterally around the upper edges thereof to maintain said receptacles within said chamber formed by said grid and table and a vaporizing well formed integrally within said flange.

8. A cooking apparatus comprising a grid of high heat conductive material having a flat upper wall defining on its upper side an uninterrupted cooking surface, means for heating said grid including a heating element in said wall in heat exchange relationship therewith and sealed thereby from said cooking surface, a cover enclosure removably mounted on said grid in sealed relationship therewith around said cooking surface to form a chamber above the cooking surface, said enclosure being apertured in the top thereof for reception of food receptacles above said cooking surface where condensation dripping from the receptacles varies on the cooking surface and is revaporized whereby heat may be selectively imparted by conduction to food placed directly on said cooking surface or by convection and radiation from the cooking surface to food in such receptacles.

References Cited in the file of this patent

UNITED STATES PATENTS

| | | |
|---|---|---|
| 1,145,977 | Denhard | July 13, 1915 |
| 1,318,168 | Newsom | Oct. 7, 1919 |
| 1,560,893 | Bonoff | Nov. 10, 1925 |
| 1,802,005 | Detwiler | Apr. 21, 1931 |
| 1,843,455 | McGowen | Feb. 2, 1932 |
| 2,217,328 | Barnes | Oct. 8, 1940 |
| 2,274,285 | Walker | Feb. 24, 1942 |
| 2,428,996 | Schworm | Oct. 14, 1947 |
| 2,522,085 | Beckemeyer et al. | Sept. 12, 1950 |
| 2,610,283 | Kolisch | Sept. 9, 1952 |
| 2,622,186 | Hutchens | Dec. 16, 1952 |
| 2,622,591 | Bramberry | Dec. 23, 1952 |
| 2,693,750 | Badenoch | Nov. 9, 1954 |
| 2,774,524 | Krause | Dec. 18, 1956 |